US007000244B1

(12) United States Patent
Adams et al.

(10) Patent No.: US 7,000,244 B1
(45) Date of Patent: Feb. 14, 2006

(54) MULTI-THREADED DIRECT MEMORY ACCESS ENGINE FOR BROADCAST DATA DEMULTIPLEX OPERATIONS

(75) Inventors: Thomas G. Adams, Longmont, CO (US); Gene Maine, Longmont, CO (US)

(73) Assignee: BroadLogic Network Technologies, Inc., Milpitas, CA (US)

( * ) Notice: Subject to any disclaimer, the term of this patent is extended or adjusted under 35 U.S.C. 154(b) by 667 days.

(21) Appl. No.: 09/651,539

(22) Filed: Aug. 29, 2000

Related U.S. Application Data

(60) Provisional application No. 60/152,047, filed on Sep. 2, 1999.

(51) Int. Cl.
- H04N 7/173 (2006.01)
- G06F 3/00 (2006.01)
- G06F 11/00 (2006.01)
- H04J 3/24 (2006.01)
- H04J 3/00 (2006.01)

(52) U.S. Cl. ................. 725/131; 725/134; 725/151; 370/474; 370/543; 370/476; 710/22; 710/23; 710/28; 714/9

(58) Field of Classification Search ............ 725/37–39, 725/46–47, 109–110, 131, 134, 239, 142, 725/151, 153, 31, 113, 89, 94; 348/423.1, 348/7, 465; 370/466–467, 487, 463, 543, 370/476, 474, 428, 429; 711/100, 202–203, 711/10; 710/22–33, 62–65

See application file for complete search history.

(56) References Cited

U.S. PATENT DOCUMENTS

| | | | |
|---|---|---|---|
| 5,559,999 A * | 9/1996 | Maturi et al. ............... | 713/400 |
| 5,650,825 A | 7/1997 | Naimpally et al. ......... | 348/465 |
| 5,659,615 A | 8/1997 | Dillon ......................... | 380/21 |
| 5,675,654 A * | 10/1997 | Ryan ........................... | 380/227 |
| 5,689,509 A | 11/1997 | Gaytan et al. | |
| 5,802,269 A * | 9/1998 | Poisner et al. ............... | 714/44 |
| 5,881,245 A | 3/1999 | Thompson ............ | 395/200.49 |
| 5,898,695 A * | 4/1999 | Fujii et al. ................... | 370/464 |
| 5,926,187 A * | 7/1999 | Kim ............................. | 345/629 |
| 5,959,659 A | 9/1999 | Dokic ........................... | 348/7 |
| 5,960,006 A | 9/1999 | Maturi et al. ............... | 370/509 |
| 6,145,016 A * | 11/2000 | Lai et al. ....................... | 710/4 |
| 6,182,287 B1 * | 1/2001 | Schneidewend et al. ...... | 725/48 |
| 6,188,381 B1 * | 2/2001 | van der Wal et al. ....... | 345/581 |
| 6,188,699 B1 * | 2/2001 | Lang et al. .................. | 370/463 |
| 6,230,215 B1 * | 5/2001 | Fadavi-Ardekani et al. ... | 710/1 |
| 6,256,683 B1 * | 7/2001 | Barry .......................... | 710/26 |
| 6,477,179 B1 * | 11/2002 | Fujii et al. ................... | 370/466 |
| 6,651,250 B1 * | 11/2003 | Takai .......................... | 725/31 |
| 6,735,662 B1 * | 5/2004 | Connor ....................... | 710/308 |

* cited by examiner

*Primary Examiner*—Hai Tran
(74) *Attorney, Agent, or Firm*—Townsend and Townsend and Crew LLP

(57) ABSTRACT

A method and system for transferring a transport stream, such as from a satellite receiver to a networked computer system, are provided. The transport stream is parsed to derive multiple elementary streams including associated program identifiers, which are used to determine corresponding transfer locations in a host memory. Direct memory access transfers of the multiple elementary streams are then performed to the corresponding transfer locations in the host memory.

11 Claims, 3 Drawing Sheets

MULTI-THREADED DIRECT MEMORY ACCESS ENGINE FOR BROADCAST DATA DEMULTIPLEX OPERATIONS

This application claims the priority of U.S. Prov. Pat. Appl. No. 60/152,047, filed Sep. 2, 1999, which is herein incorporated by reference for all purposes.

BACKGROUND OF THE INVENTION

The Digital Video Broadcast (DVB) standards and the Digital Satellite System (DSS) standards are designed for the delivery of digital video and digital audio programs to in-home set-top box appliances. More recently, interest has developed in using these standards for high bandwidth data delivery, such as to personal computers for applications such as Internet access. The data broadcast may include, for example, internet protocol (IP) packets carrying electronic mail, world wide web content, among other data.

In data broadcast systems, various elementary streams of digital video, digital audio, and digital data typically are time-division multiplexed onto a single transport stream that is broadcast by way of a satellite transponder to multiple receivers. The elementary streams of information or data are generally packetized, as is the transport stream.

A receiver, for example, may be coupled to a personal computer. Such a receiver would receive the transport stream comprising the information, demultiplex elementary streams of digital video, digital audio, and/or data from the transport stream, and filter those elementary streams destined for that receiver. The receiver further should be able to deliver the elementary streams to host memory of the personal computer for processing or display.

However, designing a receiver capable of demultiplexing, filtering, and delivering the elementary streams of information poses difficult problems and challenges. For example, critical timing constraints govern the delivery of elementary streams containing digital video and digital audio programs. These critical timing constraints derive, for example, from the specific timing required for proper decoding and presentation of digital video frames on the host computer. Hence, the particular elementary streams must be demultiplexed, filtered, and delivered in real time in such a way that these critical timing constraints are met.

SUMMARY OF THE INVENTION

Embodiments of the invention are directed to a method and system for processing a transport stream, which may comprise digital video, digital audio, data, or any other suitable information that can be transmitted via a satellite transport stream. The transport stream is parsed to derive multiple elementary streams that include associated program identifiers. The associated program identifiers are used to determine corresponding transfer locations in a host memory. Direct memory access transfers of the multiple elementary streams are performed to the corresponding transfer locations in the host memory. In one embodiment, the multiple elementary streams are transferred to an end user system, which may be, for example, an audio-visual system or a networked computer system that is equipped with a world wide web browser.

To determine the corresponding transfer locations in the host memory, each elementary stream is preferably buffered in a first-in-first-out module. The transfer location is then assigned in the host memory to the buffered elementary stream according to a particular program identifier. In this way, the transport stream may be transferred without firmware intervention.

A further understanding of the nature and advantages of the present invention may be realized by reference to the remaining portions of the specification and the drawings.

DESCRIPTION OF THE SPECIFIC EMBODIMENTS

1. Introduction

In general, direct memory access (DMA) is a capability provided by a bus architecture to allow received data to be sent directly to memory. This frees a microprocessor from involvement with the data transfer, thus speeding up overall operation. A specified portion of the memory is designated for direct memory access. Conceptually, DMA should be viewed as an alternative to a programmed input/output interface in which all transmitted data are passed through a processor.

In embodiments of the invention described herein, DMA engines are provided for efficient automated transfer for all broadcast data as well as command and control data structures to and from host memory. Such embodiments include a multithreaded hardware control data structure, which permits independent firmware processes to share common DMA hardware resources. An overview of a system in accordance with one embodiment of the invention is illustrated schematically in FIG. 1.

Figure 1:
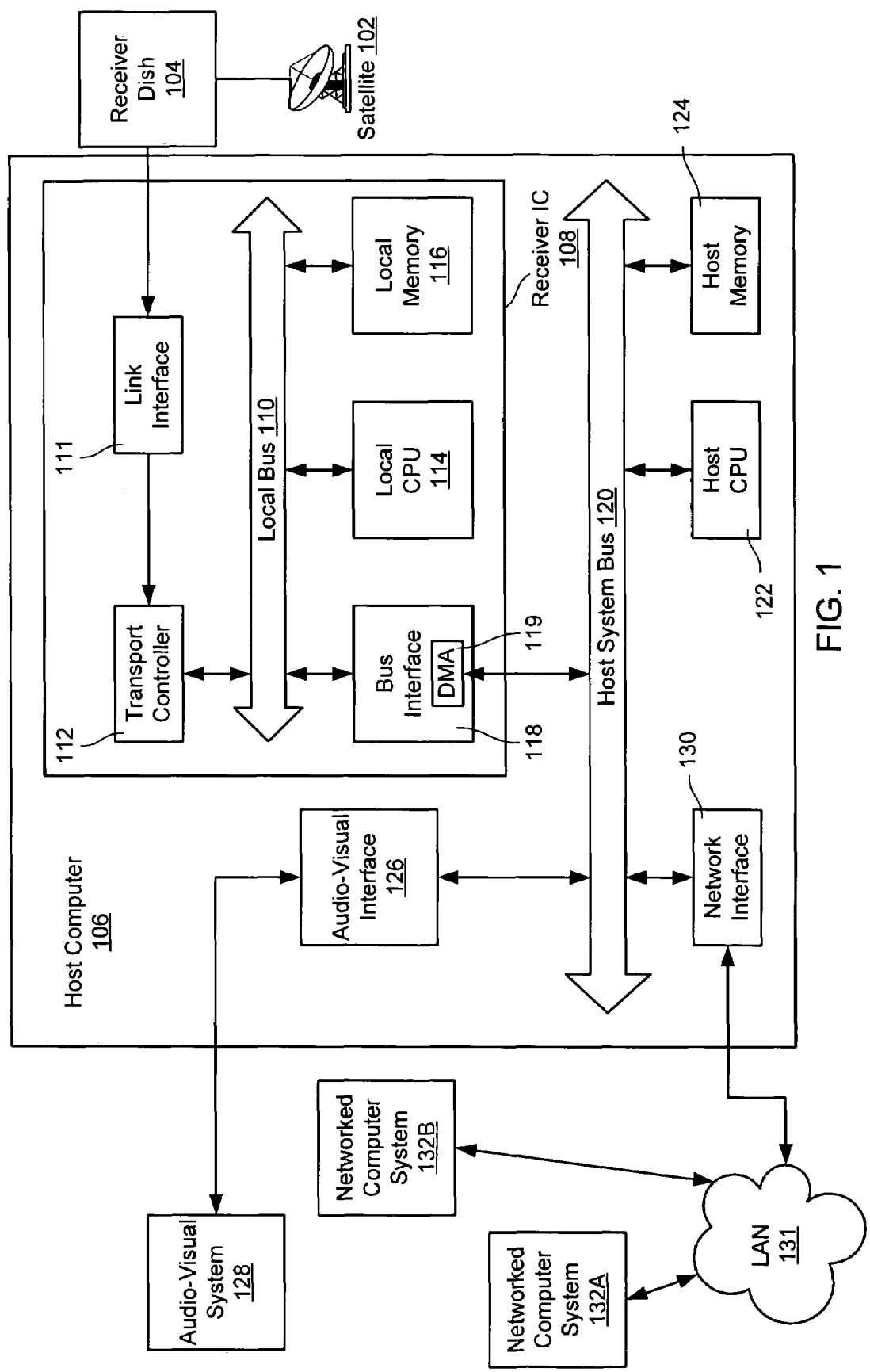
FIG. 1 is a schematic diagram including a system in accordance with one embodiment of the present invention.

As shown, a satellite transponder 102 transmits a signal comprising a transport stream to multiple receiver dishes 104, one of which is shown in FIG. 1. Receiver dish 104 in FIG. 1 is coupled to a host computer system 106 by way of a link interface 111, which may be configured into a receiver circuit 108. Receiver circuit 108 may comprise an integrated circuit, a circuit board having the different receiver components attached thereto, or any other suitable circuit design or configuration.

Receiver circuit 108 includes a local bus 110 to which is coupled a transport controller 112, a local CPU 114, local memory 116, and a bus interface 118. Transport controller 112 receives the transport stream from link interface 111 and handles low-level transport stream parsing. Local CPU 114 comprises a microcontroller that controls operations on receiver circuit 108. Local memory 116 comprises memory such as static RAM, dynamic RAM, or ROM located on receiver circuit 108.

Bus interface 118 couples local bus 110 on receiver circuit 108 to a host system bus 120 of host computer 106. In accordance with a preferred embodiment, bus interface 118 includes a DMA engine 119. In further accordance with a preferred embodiment, host system bus 120 comprises a peripheral component interface (PCI) bus, and bus interface 118 comprises a PCI interface. Also coupled to host system bus 120 may be a host CPU 122, host memory 124, a audio-visual interface 126, and a network interface 130, among other components. Host CPU 122 comprises the microprocessor of host computer 106, and host memory 124 comprises memory of host computer 106. Audio-visual interface 126 comprises a graphics interface that is coupled to an audio-visual system 128. Audio-visual system 128 may include, for example speakers, and a CRT monitor or a flat panel display. Network interface 130 comprises a network interface card, which may be coupled to a local area network (LAN) 131, which is in turn coupled to one or more networked computer system(s) 132. For example, network interface 130 may comprise an ethernet card, LAN 131 may comprise an ethernet network, and networked computer system(s) 132 may comprise personal computers.

A preferred embodiment of the present invention supports up to 256 DMA channels, also referred to as threads, for supporting DMA transfers to specific locations in host memory 124. Each program of interest is assigned to a DMA channel. A "context" for each DMA channel is stored in local memory 116. The channel context includes a current transfer target address, a byte count, and a pointer into a data structure in local memory 116 that contains frame descriptors. A frame descriptor includes the following information relating to the host memory available to the channel: a pointer to the starting address of a host memory block; the size of that block; any possible segmentation of that block, and a pointer to a next available host memory block.

When the transport stream is parsed by transport controller 112, program identifier (PID) bits in the stream are used to index into the data structure in local memory 1116, and the channel context is loaded from the data structure. Using the channel context, the automated DMA transfer of the programs and data from receiver circuit 108 to the proper region in host memory 124 is able to proceed. In this procedure, the programs and data are DMA transferred in the order received from broadcast source 102.

In a preferred embodiment, control firmware in a firmware portion of local memory 116 prepares transport controller 112 by setting the desired PID filter values and corresponding transport addresses. The firmware also prepares the data structure in local memory 116 with the frame descriptors. DMA engine 119 in bus interface 118 responds to each DMA transfer by fetching the required information from local memory 116 and performing the required transfers over host system bus 120 to host memory 124.

Subsequently, host CPU 122 transfers the elementary stream data from host memory 124 to appropriate "end user systems" which use the data. For example, an end user system may be a web browser on a networked computer system 132. In such a case, the transfer from host memory 124 occurs by way of a network interface 130. As another example, an end user system may be an audio-visual system 128. In that case, the transfer from host memory 124 would occur by way of an audio-visual interface 126.

Embodiments of the invention described herein may be complemented with flexibile media access control as described in the concurrently filed and commonly assigned application Ser. No. 09/649,792 entitled "FLEXIBLE MEDIA ACCESS CONTROL AND SECTION FILTER HARDWARE ENGINE FOR SATELLITE DATA RECEIVER," having Thomas G. Adams and Randy R. Fuller as coinventors, which is herein incorporated by reference for all purposes. Embodiments of the invention may also be complemented with timestamping aspects as described in the concurrently filed and commonly assigned application, Ser. No. 09/650,329 "SYSTEM TIME CLOCK CAPTURE FOR COMPUTER SATELLITE RECEIVER," having Thomas G. Adams and Randy R. Fuller as coinventors, which is also herein incorporated by reference for all purposes.

2. DMA Operation

Embodiments of the invention include two basic types of DMA operations, local memory access and access by transport controller 112. A local memory transfer involves moving data between PCI host memory 124 and local memory 116 such that a local read operation is defined as a transfer from PCI host memory 124 to local memory 116, and a local write operation is defined as a transfer from local memory 116 to PCI host memory 124. DMA access by transport controller 112 is an automatic programmable transport interface (PTI) operation and directly transfers write-received data to PCI host memory 124. Data are not buffered in local memory 116 prior to automatic PTI transfers.

As will be evident from the description below, these embodiments: (1) limit the size requirements of the internal buffer, thereby limiting die costs; (2) provide high performance for data transfers involving the PCI host memory; and (3) allow for PC software driver enhancements. These advantages are achieved by transferring, for example, MPEG elementary streams through the PCI interface without requiring control firmware to schedule the DMA operations for each transport packet.

In one embodiment of the invention, each transport stream packet passing PID filtering is routed to a first-in-first-out (FIFO) module comprised by transport controller 112. Transport controller 112 thus provides a unique transport address to the FIFO module to identify which PID each transport stream packet is associated with. The number of bytes transferred is recorded and a PCI transfer is scheduled automatically. By buffering each transport stream packet in the FIFO module, the stream data are transferred in the order received from satellite transponder 102 without firmware intervention. Generally, the size of the FIFO module can be determined by the maximum latency in transferring data with transport controller 112. In one embodiment, the FIFO module includes 512 bytes.

a. Local-Memory-PCI Transfers

Figure 2:
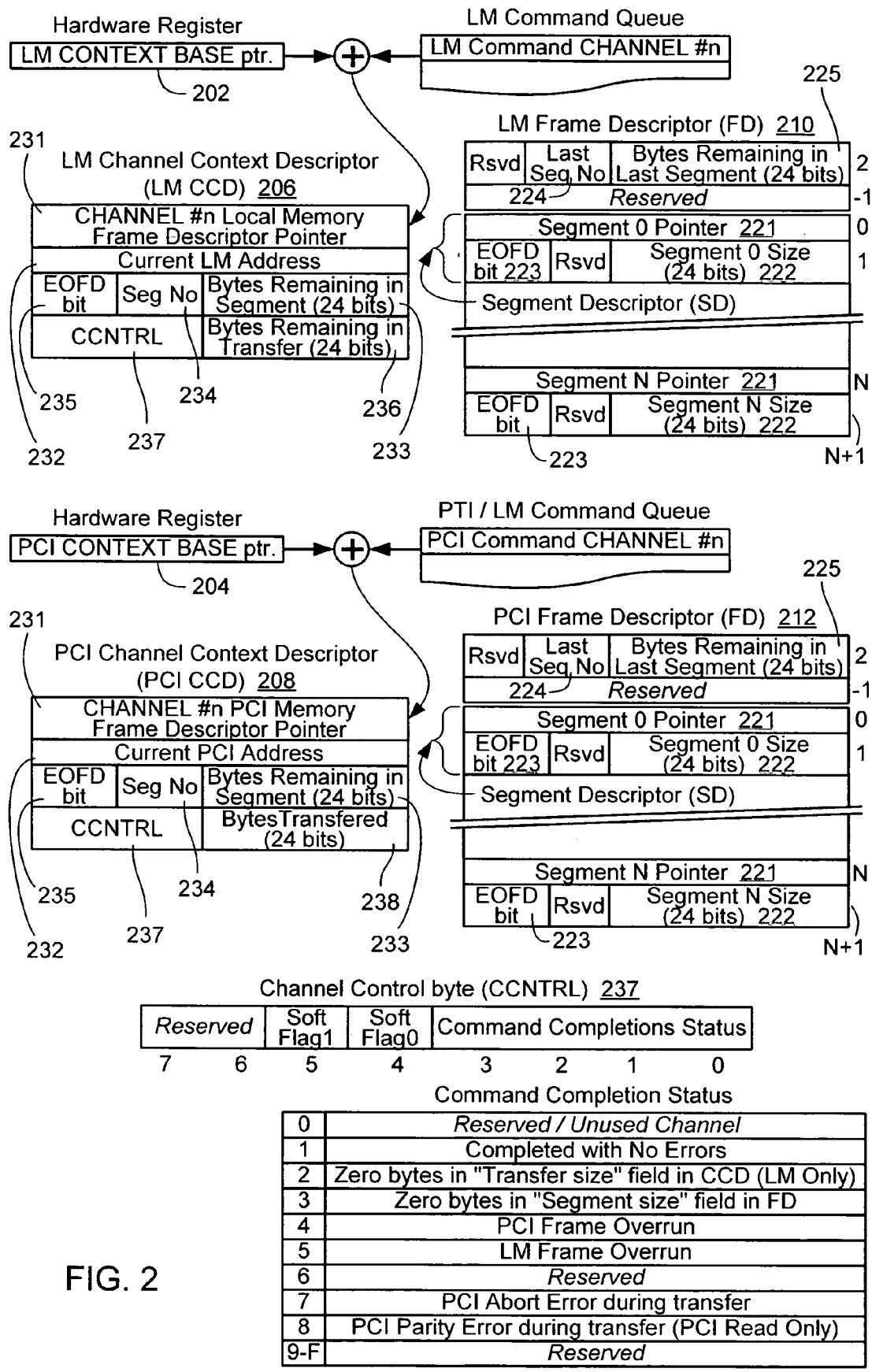
FIG. 2 is a schematic diagram of the structure of local-memory data descriptors in one embodiment of the invention.

In one embodiment, local-memory data transfers, which include transfers from PCI host memory 124 to local memory 116 and to the PCI host memory 124 from local memory 116, use various local-memory data descriptors. One such structure, using context base registers, frame descriptors, and channel context descriptors, is illustrated in FIG. 2. As an initial matter, the firmware is configured to identify local-memory context base pointers 202 and PCI context base pointers 204, both of which are programmable hardware registers that contain base addresses of the local memory channel context descriptors 206 and PCI channel context descriptors 208, respectively. The base address of the channel context descriptor identifies a channel context descriptor for channel "0" of the DMA, with all other channel addresses referenced with respect to this address. Thus in a particular embodiment where each channel context descriptor is 16 bytes, the nth DMA channel will be located at (base address)+16n. In this embodiment, the maximum size of the channel context descriptor table is thus 4 kbytes for both the local-memory and PCI channel context descriptors.

If the direction of data transfer is from local memory 116 to PCI host memory 124, local-memory frame descriptor 210 describes the region of the local memory that is the source of data, and PCI frame descriptor 212 describes the region in PCI host memory 124 where the data are to be stored. If the direction of data transfer is instead from PCI host memory 124 to local memory 116, then the definitions of frame descriptors 210 and 212 are reversed. Each of the frame descriptors 210 and 212 preferably contain the following fields: (1) a segment N pointer filed 221; (2) a segment N size field 222, which identifies the size of the Nth segment; (3) an end-of-field descriptor bit 223 to identify the last segment in a frame; (4) a last segment number field 224, which is updated at the end of a data transfer to identify the last filled segment in the frame used for that transfer; and (5) a remaining bytes field 225, which is updated at the end of a data transfer to identify the number of bytes remaining in the last segment used for that transfer.

Similar to the frame descriptors, two sets of channel context descriptors are used for a local memory 116 to PCI host memory 124 transfer. One associates the data source in local memory 116 and one associates the data destination in PCI host memory 124. Both the local-memory and PCI host-memory channel context descriptors include the following fields: (1) a channel N frame descriptor pointer field 231, which uniquely associates DMA channel N with a particular block of data; (2) a current address field 232, which points to the current PCI or local memory byte address as the data transfer progresses; (3) a segment remaining-bytes field 233, which identifies the number of bytes remaining in the current field descriptor segment and is updated in real time as the data transfer progresses; (4) a segment number 234, which identifies in real time the current segment in the frame used for the transfer; (5) an end-of-frame descriptor bit 235, copied from the end-of-frame descriptor bit 223 of the frame descriptor 210 to identify whether the current segment is the last in a frame; and (6) a channel control byte field 237.

In addition, each channel context descriptor includes a field that measures how much of the transfer has been completed. For a local-memory channel context descriptor 206, this field is a transfer remaining-bytes field 236 and is programmed prior to the DMA transfer with the number of bytes in the transfer command and is decremented as the transfer proceeds; a final nonzero value thus indicates the number of bytes not transferred as the result of a transfer error. The corresponding field for PCI host-memory channel context descriptor 208 is a bytes-transferred field 238, which instead counts the number of bytes transferred across the PCI interface. At the end of a successful transfer, the value of this field will equal the original value programmed into transfer remaining-bytes field 236. If the transfer is unsuccessful, the field records the number of bytes successfully transferred before the transfer error.

The structure of channel control byte field 237 is shown in detail in FIG. 2b. The lower nibble (bits 0–3) store a command completion status code for the channel. Bits 4 and 5 are reserved as soft flags that can be used to tag the channel with additional information.

b. Automated Controller-PCI transfers

Figure 3:
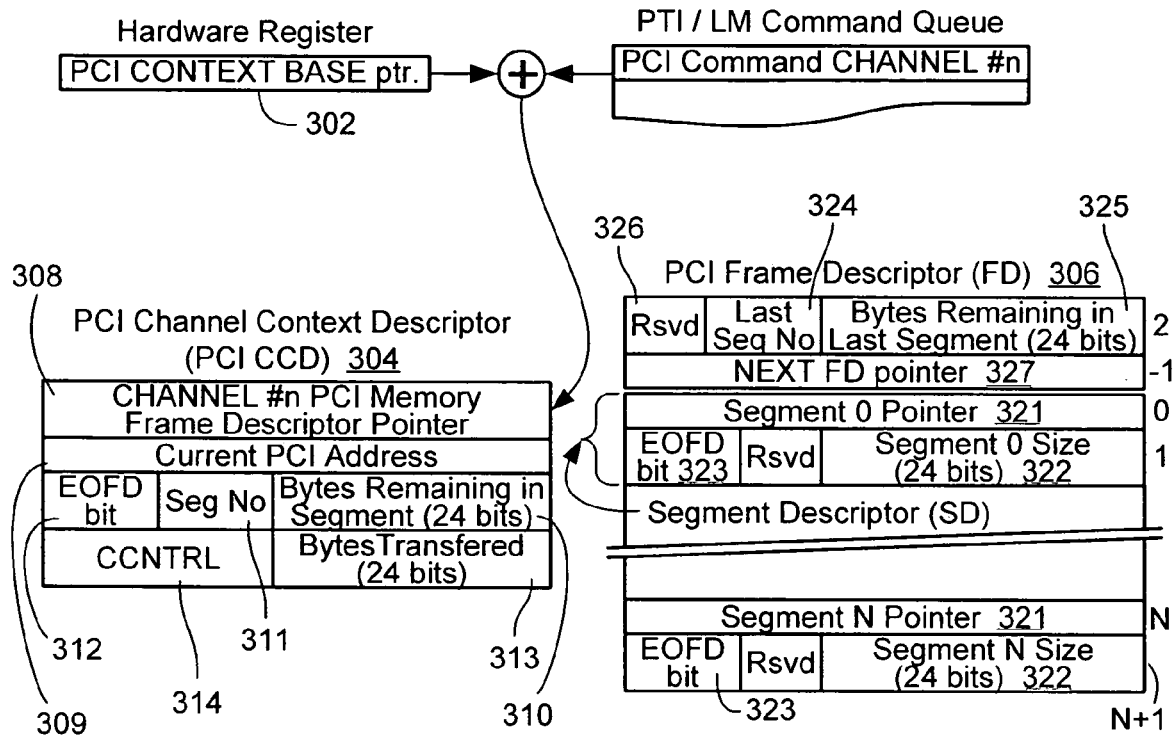
FIG. 3 is a schematic diagram of the structure of transport controller data descriptors in one embodiment of the invention.

Automated data transfers from transport controller 112 to PCI host memory 124 use a similar structure of data descriptors, as illustrated in FIG. 3. The firmware is again configured to identify PCI context base pointer 302 with reference to a base address of PCI channel context descriptors 304. By identifying this base address with channel "0" of the DMA, the address of the nth channel is given by adding the product of the channel number and byte length to the channel-0 base address.

Frame descriptors 306 preferably contain the following fields, which have a similar function as described above with respect to local-memory-PCI transfers: (1) a segment N pointer 321; (2) a segment N size field 322; (3) an end-of-field descriptor bit 323; (4) a last segment number field 324; and (5) a remaining bytes field 325. In addition, the frame descriptors 306 for automatic controller-PCI transfers preferably also include a link bit 326, which function to validate the next-frame descriptor pointer 327. If the link bit is cleared, the frame to be linked to has not been defined.

The structure of channel context descriptors 304 is also similar to the structure used for local-memory-PCI transfers and include the following fields: (1) a channel N frame descriptor pointer field 308 to associate a particular DMA channel uniquely with a particular block of data; (2) a current address field 309; (3) a segment remaining-bytes field 310; (4) a segment number field 311 that is updated in real time as the transfer progresses; (5) an end-of frame descriptor bit 312 copied from the frame descriptor 306; and (6) a channel control byte 314. Channel control byte 314 has a similar structure to that used for the local-memory-PCI transfers, but includes two additional bits. The first additional bit is an interrupt bit, which enables an interrupt for every frame segment in the data transfer. The bit can be enabled when a finer granularity than an interrupt per full frame is desirable. The second additional bit enables a data dump. When the bit is set for a particular DMA channel, any data on that channel will be discarded, so that no channel context descriptors nor frame descriptors will be updated.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of processing a transport steam comprising the steps of:
   (a) parsing the transport stream to derive multiple elemental streams including associated program identifiers;
   (b) using the associated program identifiers to assign each stream a direct memory access channel;
   (c) associating each direct memory access channel with a specific location in the memory of a host computer by providing at least one data descriptor comprising a frame descriptor and at least one data descriptor comprising a channel context descriptor, wherein the frame descriptor associates a region in local memory that is the source of data, and the channel context descriptor associates a region in the host memory where data is to be stored; and
   (d) performing direct memory access transfers of the multiple elementary streams to corresponding locations in the memory of the host computer using the direct memory access channels,
   wherein the multiple elemental streams are transferred between a local memory and the memory of the host computer and at least two sets of data descriptors are provided, wherein the first set comprises a local memory frame descriptor and a local memory channel context descriptor, and the second set comprises a host memory frame descriptor and a host memory channel context descriptor.

2. The method of claim 1 wherein the multiple elemental streams are transferred between a transport controller and the memory of the host computer.

3. The method of claim 2 wherein the direct memory access transfer is an automatic programmable transport interface operation wherein data is not buffered in a local memory prior to the transfer to the memory of the host computer.

4. The method of claim 1 further comprising the step of transferring the multiple elementary streams to an end user system.

5. The method of claim 4 wherein the end user system comprises an audio-visual system and wherein the step of transferring the multiple elementary steams to an end user system comprises transferring the multiple elementary streams through an audio-visual interface.

6. The method of claim 4 wherein the end user system comprises a networked computer system and the step of transferring the multiple elementary streams to an end user system comprises transferring the multiple elementary streams through a network interface.

7. The method of claim 1 wherein each of the frame descriptors include the following fields: (1) a segment N pointer field; (2) a segment N size field, which identifies the size of the Nth segment; (3) an end-of-field descriptor bit to identify the last segment in a frame; (4) a last segment number field, which is updated at the end of a data transfer to identify the last filled segment in the frame used for that transfer; and (5) a remaining bytes field, which is updated at the end of a data transfer to identify the number of bytes remaining in the last segment used for that transfer.

8. A system for receiving and processing a transport stream comprising:
    a receiver for the transport stream having a local memory and a transport controller; and
    a host computer having a host memory, a host central processing unit (CPU) and a direct memory access (DMA) engine;
    wherein the transport controller is configured to parse the transport stream to derive multiple elemental streams including associated program identifiers and
    wherein the local memory is configured to assign each stream a DMA channel using the associated program identifiers, and associate each DMA channel with a specific location in the host memory by providing at least one data descriptor comprising a frame descriptor and at least one data descriptors comprising a channel context descriptor, wherein the frame descriptor associates a region in local memory that is the source of the data, and the channel context descriptor associates a region in the host memory where data is to be stored; and
    wherein the DMA engine uses the DMA channels to transfer the multiple elementary streams to corresponding locations in the host memory,
    wherein each of the channel context descriptors include the following fields: (1) a channel N frame descriptor pointer field, which uniquely associates DMA channel N with a particular block of data; (2) a current address field, which points to the current host or local memory byte address as the data transfer progresses; (3) a segment remaining-bytes field, which identifies the number of bytes remaining in the current field descriptor segment and is updated in real time as the data transfer progresses; (4) a segment number, which identifies in real time the current segment in the frame used for the transfer; (5) an end-of-frame descriptor bit, copied from the end-of-frame descriptor bit of the frame descriptor to identify whether the current segment is the last in a frame; and (6) a channel control byte field.

9. The system of claim 8 wherein the transport controller is configured by the local memory to associate the program identifiers with corresponding DMA channels so that data is directly transferred between the transport controller and the host memory without being buffered in the local memory prior to transfer.

10. A system for receiving and processing a transport stream comprising:
    a receiver for the transport stream having a local memory and a transport controller; and
    a host computer having a host memory, a host central processing unit (CPU) and a direct memory access (DMA) engine;
    wherein the transport controller is configured to parse the transport stream to derive multiple elemental streams including associated program identifiers and
    wherein the local memory is configured to assign each stream a DMA channel using the associated program identifiers, and associate each DMA channel with a specific location in the host memory by providing at least one data descriptor comprising a frame descriptor and at least one data descriptors comprising a channel context descriptor, wherein the frame descriptor associates a region in local memory that is the source of the data, and the channel context descriptor associates a region in the host memory where data is to be stored; and
    wherein the DMA engine uses the DMA channels to transfer the multiple elementary streams to corresponding locations in the host memory,
    wherein each of the frame descriptors include the following fields: (1) a segment N pointer field; (2) a segment N size field, which identifies the size of the Nth segment; (3) an end-of-field descriptor bit to identify the last segment in a frame; (4) a last segment number field, which is updated at the end of a data transfer to identify the last filled segment in the frame used for that transfer; and (5) a remaining bytes field, which is updated at the end of a data transfer to identify the number of bytes remaining in the last segment used for that transfer.

11. The system of claim 10 wherein the transport controller is configured by the local memory to associate the program identifiers with corresponding DMA channels so that data is directly transferred between the transport controller and the host memory without being buffered in the local memory prior to transfer.

* * * * *